Aug. 25, 1942.  C. L. BEAL  2,293,927
METHOD OF MAKING ARTICLES COMPRISING POROUS RUBBER
Filed Aug. 12, 1938
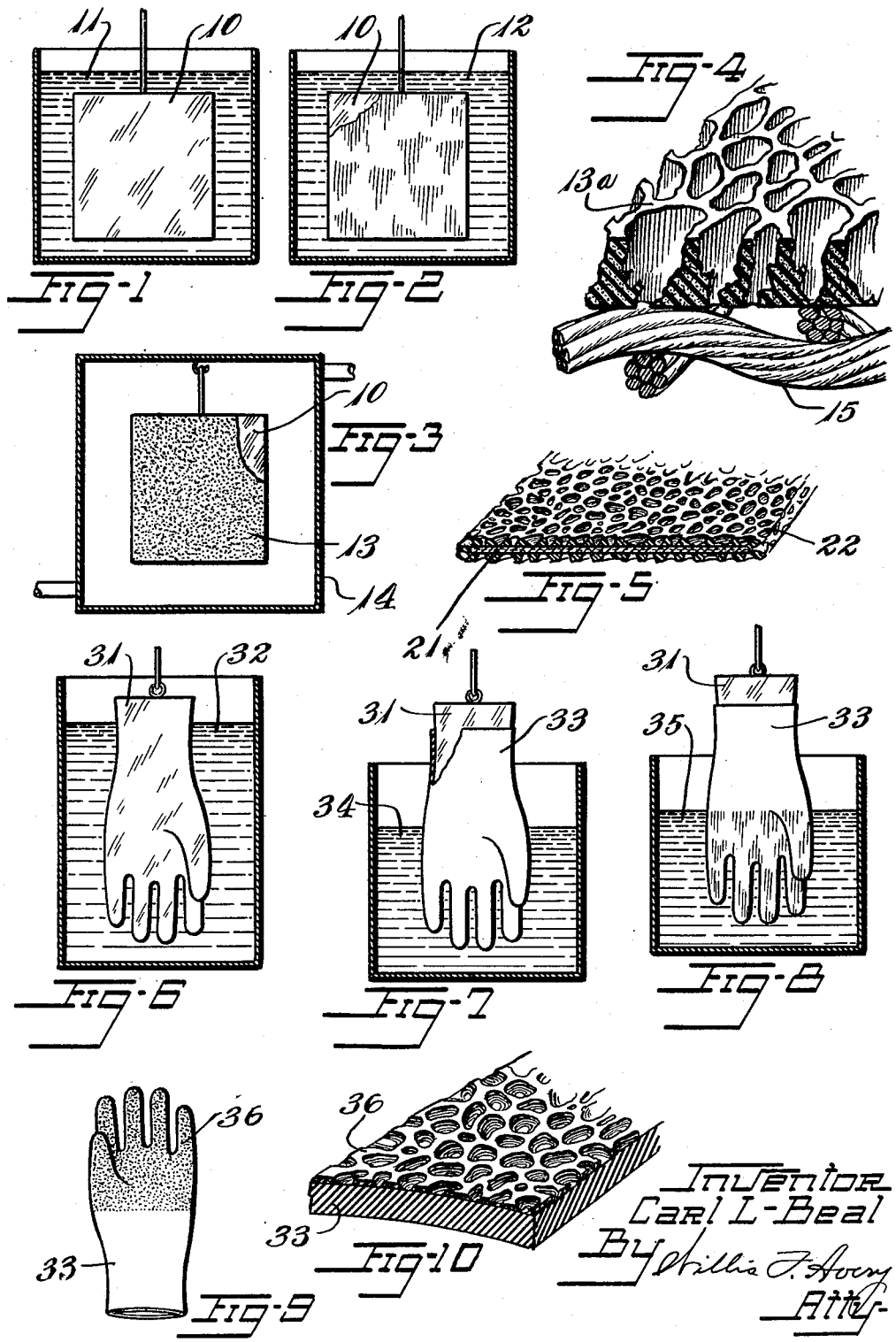

Patented Aug. 25, 1942

2,293,927

UNITED STATES PATENT OFFICE 2,293,927

METHOD OF MAKING ARTICLES COMPRISING POROUS RUBBER

Carl L. Beal, Cuyahoga Falls, Ohio, assignor to American Anode Inc., Akron, Ohio, a corporation of Delaware Application August 12, 1938, Serial No. 224,486

11 Claims. (Cl. 117—163)

This invention relates to articles composed of or embodying porous rubber and to methods of making such articles, and is especially useful in manufacturing porous rubber sheets for service as filter cloths, as electrolytic diaphragms, and the like, and for producing novel porous surface effects including anti-slip and decorative surfaces on various manufactured articles.

According to the present invention, such porous articles and surfaces are produced by treating a base member with a latex-coagulating composition containing an acidic material such as acetic acid and associating the treated base member with a rubber latex composition containing an agent such as ammonium carbonate which will react with the acidic material to evolve considerable quantities of gaseous material at the interface between the base member and the latex as well as within the forming layer of latex coagulum as the latex is progressively coagulated by the coagulating composition. In this manner, there is produced a rubber layer or sheet which is pervaded by a multitude of pores in the form of irregular craters originating adjacent the face of the layer in contact with the base member and increasing in cross-sectional area outward to the other face of the layer. Such pores frequently are of microscopic dimensions at one face and increase irregularly to macroscopic dimensions of the order of $\frac{1}{64}$ to $\frac{1}{16}$ inch in average diameter at the other face. Such porous rubber sheets make unusually satisfactory filter cloths when used with the finely porous face as the filtering surface as the crater shaped pores will not clog as do pores of substantially uniform size from face to face. Such sheets also function satisfactorily as electrolytic diaphragms and may be used as separator plates in storage batteries. In a modified embodiment of the invention, it has been found that such a porous rubber layer may advantageously be produced as a thin exterior coating upon an imperforate rubber article to provide a non-slip and decorative surface, the finely porous inner face merging with the body of the article proper after vulcanization to provide a strong mutual bond while the coarsely porous outer face provides an unusually efficient non-slip surface which may include variegated colors to produce decorative effects.

The invention will be described more fully with reference to the accompanying drawing, of which Fig. 1 is a sectional elevation illustrating an early step in manufacturing a filter cloth according to the present invention and showing a base-member being treated with an acidic composition which will coagulate rubber latex;

Fig. 2 is a sectional elevation illustrating a succeeding step in the process and showing the acid-treated base member associated with a liquid rubber latex composition receiving a coating deposit of rubber;

Fig. 3 is a sectional elevation illustrating the steps of drying and vulcanizing the rubber;

Fig. 4 is a fragmentary sectional prospective view on a considerably enlarged scale showing a filter cloth made according to the present invention;

Fig. 5 is a vertically sectioned fragmentary perspective view showing an electrolytic diaphragm embodying the principles of the present invention, the pores in the diaphragm being arbitrarily shown considerably enlarged for clarity of illustration;

Fig. 6 is a sectional elevation illustrating an early step in manufacturing an article such as a rubber glove having a non-slip surface, and showing a glove deposition form immersed in liquid rubber latex composition for receiving a coating deposit of latex coagulum;

Fig. 7 is a sectional elevation illustrating a succeeding step in the manufacture of the glove and showing the coating deposit of rubber coagulum being treated with an acidic composition;

Fig. 8 is a sectional elevation illustrating a latex step in the manufacture of the glove and showing the acid-treated deposit of latex coagulum associated with a latex rubber composition containing a gas-producing agent;

Fig. 9 is an elevation of a finished glove having a rough non-slip surface produced according to the present invention; and Fig. 10 is an enlarged fragmentary sectional perspective view showing a portion of the glove of Fig. 9, and illustrating in a general way the character of rough porous surface produced in the present invention.

The base-members utilized in the present process preferably are porous or bibulous in character for the purpose of absorbing and retaining substantial quantities of acidic material for subsequent reaction with the gas-producing agent in the latex, although impervious base members often may be employed with complete satisfaction, especially when very thin layers or porous rubber are to be produced.

To produce a filter cloth, for example, the base member may be an unglazed porcelain or other porous ceramic plate 10 of appropriate size. In the process, the base member 10 is treated with an acidic composition 11 such as a 20% aqueous solution of acetic acid, as my momentarily immersing the base member in the acidic composition as shown in Fig. 1 to permit the porous base member to absorb a considerable quantity of the acid composition. The treated base member then is associated with and preferably is immersed in (Fig. 2) a liquid rubber latex composition 12 containing, for example, 2% by volume of ammonium carbonate together with the usual vulcanizing, compounding and conditioning ingredients. The base member is permitted to remain in the latex for about three minutes and then is withdrawn after which the base member is found to be enveloped by a substantially uniform layer of porous coagulated rubber 13 about $\frac{1}{16}$ inch thick. To prevent the formation of an impervious skin on the outer face of the layer as a result of subsequent drying of uncoagulated latex remaining on the surface, the rubber layer is promptly washed with an alkaline solution preferably containing a colloidal material. An aqueous solution containing 1 part by volume of concentrated (28%) ammonium hydroxide in 100 parts of distilled water, or an equivalent quantity of sodium hydroxide or potassium hydroxide, together with from 0.2% to 1.0% of a colloid such as gelatine, casein, gum arabic, agar, soap, etc. is quite satisfactory for this purpose. The porous layer next is washed in running water for several hours to leach out water-soluble materials and then is dried and vulcanized in any conventional manner as by heating for an appropriate time in a hot air oven 14 as shown diagrammatically in Fig. 3. If a freely flexible filter cloth is desired, the latex composition may be compounded and vulcanized to produce a soft-vulcanized rubber sheet. In other cases where decreased flexibility is not undesirable, the rubber may be compounded and vulcanized to produce a hard-vulcanized porous rubber sheet which will be especially useful for filtering many corrosive solutions to which hard rubber is more resistant than other materials. The porous rubber may be vulcanized while still on the base member as illustrated in Fig. 3, or the unvulcanized deposit may be removed from the base member and thereafter vulcanized. In either case, the envelope preferably is slit along the edges, either before or after vulcanization, to provide two similar sheets of porous rubber which may be used as filter cloths. If desired, such a porous rubber sheet 13a may be provided with a reenforcing element, as by cementing a coarsely woven sheet of textile fabric 15 to one face, preferably the finely porous face, of the rubber sheet to produce a finished filter cloth as illustrated in Fig. 4. Such a filter cloth will be used, of course, with the fabric-reenforced finely porous face as the filtering surface, but has been illustrated in Fig. 4 with the coarsely porous face up in order to show the character of the pores more clearly.

As illustrated in Fig. 4, the pores in a porous rubber sheet made according to the present invention are crater-like in form and usually extend from one face of the sheet to the other face with gradually, but not uniformly, increasing cross-sectional size. As has been indicated, the pores frequently are of microscopic dimensions at the finely porous face and increase to macroscopic dimensions of the order of $\frac{1}{64}$ to $\frac{1}{16}$ inch average diameter at the coarsely porous face. As may readily be appreciated, any material which passes through the finely porous face of the filter cloth will pass more easily through the length of the pores and accordingly will not clog the pores as frequently occurs in filtering cloths having pores of substantially uniform size from face to face.

In many cases, the base member may be permitted to remain associated with the porous rubber layer to become an integral part of the finished product. For example, the invention may be used to produce electrolytic diaphragms in which case the base member may be textile fabric, porous paper, or similar porous sheet material. A microporous paper sheet is especially satisfactory for this purpose as the microporous paper not only provides reenforcement for the necessarily rather fragile rubber deposit but also provides a microporous screen across any pores in the rubber sheet which may be undesirably large at the finely porous face.

Such an electrolytic diaphragm illustrated in Fig. 5 ordinarily will consist of a microporous sheet of rather heavy paper or other fibrous material 21 of appropriate size completely enveloped by an adherent porous rubber layer 22 produced according to the present invention by treating the fibrous sheet with an acid composition and associating the treated sheet with latex containing a gas-producing agent substantially as hereinabove described. In such a diaphragm, the pores will be substantially microscopic in dimensions adjacent the fibrous insert and will increase in size outwardly to macroscopic dimensions at the exposed faces of the rubber. The porous rubber of electrolytic diaphragms usually will be vulcanized to the hard rubber state.

The invention also is useful in providing rough surfaces having non-slip and/or decorative characteristics upon many types of articles where such surfaces are of value. For example, so-called household rubber gloves advantageously may be provided with a rough non-slip surface to prevent slippage when the wearer is handling wet or moist articles such as wet dishes.

To manufacture a rough-surfaced rubber glove according to the present invention, (Figs. 6 to 10) a conventional glove form 31 is immersed in a standard compounded rubber latex composition 32 and a coating of latex rubber 33 about 0.010 inch thick (when dried) is deposited upon the glove form in any well-known manner. The glove form 31 together with the undried deposited rubber coating 33 then is treated with an acidic material, as by immersing the form and deposit in a 25% aqueous solution of formic acid 34 and a considerable quantity of the formic acid solution is permitted to soak into the undried latex rubber layer. The treated rubber layer then is immersed in a compounded latex composition 35 containing 2% by volume of ammonium carbonate together with the usual compounding, conditioning and vulcanizing agents required to produce a high grade soft-vulcanized rubber vulcanizate. The treated form is permitted to remain in the latex 35 for one minute and then is withdrawn, washed, dried, vulcanized and stripped from the form in the usual manner.

The finished household glove illustrated in Fig. 9 is found to have a rough porous surface layer 36 providing an unusually effective non-slip surface integrally bonded by the concurrent vulcanization to the imperforate glove body. The pores at the inner face of the surface layer are very fine and the surface of the porous layer in contact with the main imperforate body of the glove is therefore substantially continuous and permits a strong, reliable bond between the two layers, while the pores at the outer, exposed face of the porous layer are much larger and present a veined, pitted surface having unusual non-slip characteristics.

Colored latices may be used in producing the porous surface layers in which case pleasing decorative effects will be obtained, particularly if the porous layer is quite thin and of a color differing from the color of the imperforate body of the glove. Effects of the latter character are beneficial in toy balloons as the inflation of the balloon stretches the colored porous layer to a lacy colored network contrasting with the differently colored body of the balloon which shows through the lacy layer in spots.

In such cases where only a very thin porous layer is required and the coagulating effect of the acidic treating material on the latex is not needed to build up a heavier layer, the latex composition containing the gas-producing agent may be applied directly to an untreated base member and the layer of latex then treated on the exposed surface with acidic material to produce the porosity. Such procedure will, however, produce a porous deposit of somewhat different character and appearance as the gas is not evolved at the interface between the base member and the latex nor during formation of the deposit as in the preferred procedure.

Numerous modifications in details of the invention as hereinabove described of course are possible. The deposition base may be made of any conventional material but, as has been indicated, desirably should be sufficiently porous or bibulous to absorb a substantial quantity of the acidic treating material. Spongy rubber, porous ceramic ware, wood, bibulous paper, fabric and the like may be used as the deposition base member. If very thick porous coatings are desired the porous-layer producing steps of the process may be repeated several times, each porous layer serving as a base member for absorbing acid to produce the succeeding porous layer. Organic solvents such as alcohol, acetone, or the like may be used as the solvent for the acid instead of water as described, and other organic or inorganic acids such as propionic, dilute hydrochloric or dilute sulfuric, etc. may replace the formic and acetic acids specifically mentioned. Likewise, the acid solution may contain other latex coagulants such as bivalent metallic salts to assist in coagulating the porous latex layer, and in many cases will contain a well known wetting agent to promote uniform interfacial contact between the acid solution and the base member and also with the latex. Other gas-producing agents such as ammonium nitrate, sodium bicarbonate, calcium carbonate and the like may be used in widely varying proportions in place of the ammonium carbonate specifically mentioned.

The "liquid rubber latex" utilized in the present invention may be any naturally occurring or artificially prepared aqueous dispersion of natural or synthetic rubber and rubber-like materials and may contain any desirable thickening, thinning, preserving, stabilizing, compounding, vulcanizing, age-resisting or other conditioning agents, according to conventional practice. The term "latex rubber" similarly refers ot rubber deposited in situ directly from such liquid rubber latex.

All such modifications and variations are within the scope of the invention as defined by the appended claims.

I claim:

1. The method of producing a body of porous rubber which comprises depositing rubber from liquid rubber latex upon a base member and, simultaneously with the deposition, evolving gaseous material at the interface between the base member and the latex and within the forming deposit by chemical reaction of an acidic material with a gas producing agent, one of said reacting materials being contained in the latex and the other being supplied from the base member.

2. The method of producing a body of porous rubber which comprises forming a deposit of rubber by coagulating a liquid rubber latex composition containing an agent which will liberate gaseous material upon treatment with an acid and, simultaneously with the formation of the deposit, treating the latex with an acid, and drying the resultant porous layer of rubber.

3. The method of producing a body of porous rubber which comprises treating a base member with acidic material, associating the treated base member with liquid rubber latex containing an agent which will liberate gaseous material upon reaction with said acidic material, and drying the resultant coagulated porous layer of rubber.

4. The method of producing a composite article including a layer of porous rubber, which comprises providing a base member of absorbent material designed to become an integral part of the article, treating the base member with a solution of an acid which will coagulate latex and permitting the base member to absorb a substantial quantity of the acid solution, associating the treated base member with a liquid rubber latex composition containing an agent which will liberate gaseous material upon reacting with said acid, continuing the association of the base member and the latex until a desired thickness of porous rubber coagulum has been produced upon the base member, and drying and vulcanizing the porous rubber in situ on the base member.

5. The method of making a rubber article having a surface layer of porous rubber overlying a base layer of non-porous rubber, which comprises forming a base deposit of latex rubber coagulum which upon drying will yield an imperforate layer of rubber, soaking a substantial quantity of an acid in liquid form into the undried deposit of coagulum, associating the treated coagulum with liquid rubber latex containing an agent which will liberate gaseous material upon reaction with said acid, whereby a coating layer of porous latex rubber coagulum is formed upon the base layer of rubber coagulum, and drying and vulcanizing the rubber.

6. The method of making a rubber article having a surface layer of porous rubber overlying a base layer of non-porous rubber, which comprises forming a deposit of latex rubber coagulum which upon drying will yield an imperforate layer of rubber, applying to the base layer a coating of liquid rubber latex containing an agent which will liberate gaseous material upon reaction with an acid, and treating the coating of liquid rubber latex with a solution containing an acid whereby the layer of latex is coagulated and rendered porous, and drying and vulcanizing the resultant article.

7. The method of producing a body of porous rubber which comprises treating a base member with acidic material, associating the treated base member with liquid rubber latex containing an agent which will liberate gaseous material upon reaction with said acidic material, washing the resultant porous rubber deposit with an alkaline solution, and drying the porous rubber.

8. The method of producing a body of porous rubber which comprises treating a base member with acidic material, associating the treated base member with liquid rubber latex containing an agent which will liberate gaseous material upon reaction with said acidic material, washing the resultant porous rubber deposit with an alkaline solution containing a colloidal material, and drying the porous rubber.

9. In the manufacture of porous latex rubber, a process which includes the steps of forming a deposit of porous latex rubber and washing the deposit with an alkaline solution before it is dried.

10. In the manufacture of porous latex rubber, a process which includes the steps of forming a deposit of porous latex rubber and washing the deposit with an alkaline solution containing a colloidal material.

11. In the manufacture of porous latex rubber, a process which includes the steps of forming a deposit of porous latex rubber and, before the deposit is dried, washing it with an alkaline solution containing a colloidal material.

CARL L. BEAL.